(12) United States Patent
Goldschmidt et al.

(10) Patent No.: US 8,770,810 B2
(45) Date of Patent: Jul. 8, 2014

(54) REAR VIEW MIRROR ASSEMBLY WITH OPTICAL INDICATOR

(75) Inventors: Soenke Goldschmidt, Weinstadt (DE); Xavier Beuzeville, Les Ecrennes (FR); Thomas Baggi, Savigny le Temple (FR)

(73) Assignee: SMR Patents S.a.r.l., Luxembourg (LU)

( * ) Notice: Subject to any disclaimer, the term of this patent is extended or adjusted under 35 U.S.C. 154(b) by 526 days.

(21) Appl. No.: 12/965,775

(22) Filed: Dec. 10, 2010

(65) Prior Publication Data
US 2012/0147613 A1    Jun. 14, 2012

(51) Int. Cl.
*B60Q 1/26*    (2006.01)
*B60R 1/12*    (2006.01)

(52) U.S. Cl.
USPC ............................ 362/494; 362/615; 362/625

(58) Field of Classification Search
CPC ... F21S 48/115; F21S 48/1195; F21S 48/215; F21S 48/2225; G02B 6/0036; G02B 6/0038; G02B 6/0043; G02B 6/0046; G02B 6/0018; G02B 6/0016; G02B 6/0035
USPC ............ 362/494, 249.01, 519, 545, 549, 615, 362/621, 341, 307, 311.06, 347
See application file for complete search history.

(56) References Cited

U.S. PATENT DOCUMENTS

| 5,207,492 | A |   | 5/1993  | Roberts          |         |
|-----------|---|---|---------|------------------|---------|
| 5,355,284 | A |   | 10/1994 | Roberts          |         |
| 5,361,190 | A |   | 11/1994 | Roberts et al.   |         |
| 5,481,409 | A |   | 1/1996  | Roberts          |         |
| 5,528,422 | A |   | 6/1996  | Roberts          |         |
| 5,587,699 | A |   | 12/1996 | Faloon et al.    |         |
| 5,619,374 | A |   | 4/1997  | Roberts          |         |
| 5,788,357 | A | * | 8/1998  | Muth et al.      | 362/494 |
| 5,823,654 | A | * | 10/1998 | Pastrick et al.  | 362/494 |
| 5,938,320 | A | * | 8/1999  | Crandall         | 362/494 |
| 6,005,724 | A |   | 12/1999 | Todd             |         |
| 6,099,154 | A | * | 8/2000  | Olney            | 362/494 |
| 6,106,121 | A |   | 8/2000  | Buckley et al.   |         |
| 6,166,848 | A |   | 12/2000 | Cammenga et al.  |         |
| 6,257,746 | B1|   | 7/2001  | Todd et al.      |         |

(Continued)

FOREIGN PATENT DOCUMENTS

EP    0450162    10/1991
EP    1281574    2/2003

(Continued)

OTHER PUBLICATIONS

European Search Report for application No. EP 10 19 4469 Jun. 1, 2011.

(Continued)

*Primary Examiner* — Diane I Lee
*Assistant Examiner* — Danielle Allen
(74) *Attorney, Agent, or Firm* — Reising Ethington PC

(57) ABSTRACT

A rear view mirror assembly is proposes having at least a mirror base and a mirror head covering a mirror glass (54) mounted into the mirror head and an optical alert indicator (62) that produces light in reaction to a sensor signal to inform operator (28) about hazardous information and the light shines through the mirror glass (54). The mirror glass (54) is mounted to a backing plate (52) that has a mounting surface (53) for at least one LED (64) and at least one light guide structure that can be a wedged light guide or a light guide pin.

12 Claims, 8 Drawing Sheets

(56) References Cited

U.S. PATENT DOCUMENTS

| | | |
|---|---|---|
| 6,264,353 B1 | 7/2001 | Caraher et al. |
| 6,276,821 B1 | 8/2001 | Pastrick et al. |
| 6,356,376 B1 | 3/2002 | Tonar et al. |
| 6,426,485 B1 | 7/2002 | Bulgajewski et al. |
| 6,441,943 B1 | 8/2002 | Roberts et al. |
| 6,512,624 B2 | 1/2003 | Tonar et al. |
| 6,650,457 B2 | 11/2003 | Busscher et al. |
| 6,657,767 B2 | 12/2003 | Bonardi et al. |
| 6,749,325 B2 | 6/2004 | Bukosky et al. |
| 6,910,779 B2 | 6/2005 | Abel et al. |
| 6,918,685 B2 | 7/2005 | Bukosky et al. |
| 6,963,438 B2 | 11/2005 | Busscher et al. |
| 7,008,091 B2 | 3/2006 | Mathleu et al. |
| 7,025,486 B2 | 4/2006 | Lang et al. |
| 7,104,676 B2 | 9/2006 | Bukosky et al. |
| 7,241,037 B2 | 7/2007 | Mathieu et al. |
| 7,273,307 B2 | 9/2007 | Mathieu |
| 7,293,901 B2 | 11/2007 | Tuttle et al. |
| 7,327,321 B2 | 2/2008 | Todd et al. |
| 7,360,931 B2 | 4/2008 | Haag |
| 7,404,654 B2 | 7/2008 | Lueftner |
| 7,416,318 B2 | 8/2008 | Mathieu |
| 7,427,150 B2 | 9/2008 | Carter et al. |
| 7,452,113 B2 | 11/2008 | Newton et al. |
| 7,581,859 B2 | 9/2009 | Lynam |
| 2002/0163790 A1 | 11/2002 | Yamashita et al. |
| 2003/0156328 A1* | 8/2003 | Goto et al. ............. 359/599 |
| 2006/0215413 A1* | 9/2006 | Mathieu et al. ............. 362/494 |
| 2007/0058257 A1 | 3/2007 | Lynam et al. |
| 2007/0248714 A1 | 10/2007 | Dean et al. |
| 2009/0115631 A1 | 5/2009 | Foote et al. |
| 2010/0238015 A1 | 9/2010 | Fukasawa et al. |

FOREIGN PATENT DOCUMENTS

| | | |
|---|---|---|
| EP | 1970736 | 9/2008 |
| JP | 2004111384 | 4/2004 |
| WO | 0023826 | 4/2000 |
| WO | 0204858 A2 | 1/2002 |
| WO | 2006017019 | 2/2006 |

OTHER PUBLICATIONS

EP Office Action dated May 23, 2013; 5 pages.
CN Office Action dated Jan. 26, 2014; 8 pp.

* cited by examiner

REAR VIEW MIRROR ASSEMBLY WITH OPTICAL INDICATOR

BACKGROUND ART

1. Field of the Invention

The invention relates to an assembly with an optical indicator placed in a side rear view mirror assembly for a motor vehicle. More particularly, the invention relates to an optical indicator that is mounted to shine through the mirror glass of the side rear view mirror assembly and is preferably used as an alert signal and for identifying when an object is occupying the blind spot of the motor vehicle.

2. Description of the Related Art

The driver of a motor vehicle must recognize that objects such as other motor vehicles move with respect to the motor vehicle being driven by the driver. As such, the driver must constantly review his or her surroundings to determine whether a desired path of travel is obstructed and, if taken, would cause a collision. Tools that assist a driver in reviewing the space surrounding the motor vehicle include the rear view mirror and the side rear view mirrors. These mirrors allow the driver to review the surroundings generally disposed behind the driver without the driver having to turn his or her head more than a minimal amount. Locations commonly referred to as "blind spots" exist on either side of the motor vehicle. These blind spots are spaces that are not visible to the driver when the driver is looking in the mirrors. Therefore, the viewing of these blind spots requires the driver to turn his or her head to look to see if another motor vehicle of some other object has entered the blind spots. To overcome this problem, blind spot indicators have sensors that identify when objects enter blind spots. These sensors notify the driver that a blind spot is now being occupied. Indicators in the art include light generators and sound generators. Placement of these generators is critical as it is in the best interests of the driver to have these located within the driver's peripheral vision and in an area where the driver frequently looks.

Optical indicators are used to alert the driver of a vehicle that a hazardous situation has been sensed by automatic sensors. Blind spot detection is one of these alert indications. There are other hazardous situations that can be detected by sensors and indicated with the alert indicator. Examples are a distance control, surrounding monitoring, crash warning, temperature indication and ice warning, status indications etc.

It is known from U.S. Pat. No. 6,276,821 to mount an indicator behind a mirror glass to shine through the reflective surface. In FIG. 44 of this prior art patent, an example is shown, that includes a backing plate with an integrated device that covers a LED and a light guide structure. The backing plate is connected to the mirror glass and is adjustable mounted in the mirror head.

The prior art solution does not fulfill the need to direct light to driver's eyes in a sufficient way and to be designed for an easy and cost efficient way.

SUMMARY OF THE INVENTION

A side rear view mirror assembly is used in conjunction with a motor vehicle equipped with a blind spot sensor designed to detect objects in blind spots of the motor vehicle. The side rear view mirror assembly includes a base fixedly secured to the motor vehicle. A mirror case is movably secured to the base. The mirror case defines a housing and a mirror opening facing rearward. A backing plate is operatively connected to the mirror case facing rearward. The backing plate is movable with respect to the mirror case. A mirror glass is fixedly secured to the backing plate and movable therewith in a manner allowing an operator of the motor vehicle to view rearward of the motor vehicle. The side rear view mirror assembly also includes a blind spot indicator fixedly secured to the backing plate and in communication with the blind spot sensor to receive signals from the blind spot sensor and to indicate to the operator of the motor vehicle when an object is in a blind spot of the motor vehicle. The blind spot indicator is directed at the operator when the operator moves the backing plate to adjust the mirror glass. The indicator is integrated into the backing plate and has a small profile. The optical indicator is structured with at least one light source and a light guide designed as a wedge and forming a tray.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
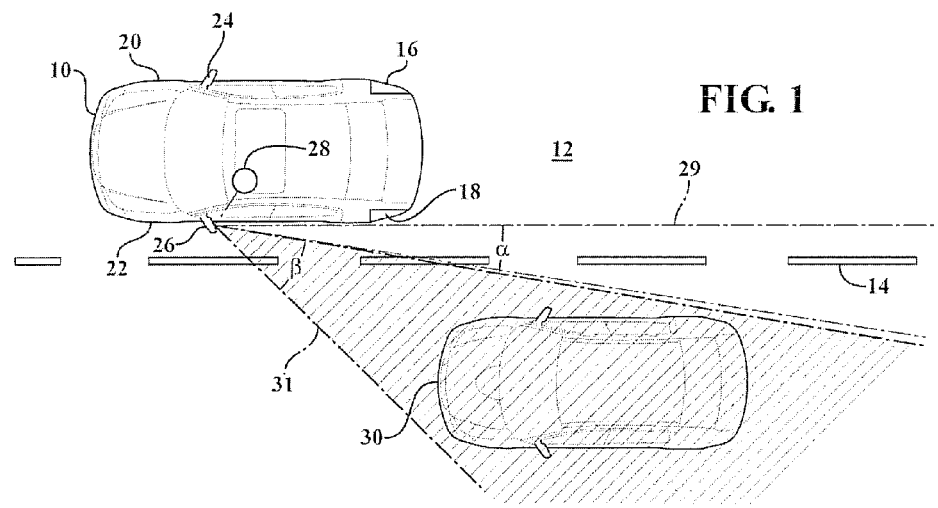
FIG. 1 is a top view of a motor vehicle with a second motor vehicle located in a blind spot of the first motor vehicle.

Referring to FIG. 1, a motor vehicle 10 is shown driving along a road 12 that has a dashed line 14 indicating a boundary of a lane of the road 12. The motor vehicle 10 is equipped with blind spot sensors 16, 18 disposed along each side 20, 22 of the motor vehicle 10. The motor vehicle 10 is also equipped with two side rear view mirror assemblies 24, 26 that extend out from each of these sides 20, 22 respectively. The side rear view mirror assemblies 24, 26 are used by an operator, graphically represented by a circle 28 in FIG. 1, to identify things that are going on outside the motor vehicle 10 rearwardly thereof. The operator 28 will adjust the side rear view mirror assemblies 24, 26 in a manner which allows the operator 28 to be satisfied that as much of the space rearward that can be viewed is being viewed by the operator 28. While most, if not all, motor vehicles 10 are equipped with two side rear view mirror assemblies 24, 26, the remainder of the discussion will focus on the side rear view mirror assembly 26 that is on the driver side 22 of the motor vehicle 10. It will be appreciated by those skilled in the art that the following discussion with regard to the driver side rear view mirror assembly 26 applies equally to the rear view mirror assembly 24 on the passenger side 20 of the motor vehicle 10.

When an operator 28 uses a side rear view mirror assembly 26, it is typically adjusted such that the orientation of the mirror includes a portion of the driver side 22 of the motor vehicle therein. The operator 28 does this for purposes of orientation. As is shown in FIG. 1, the field of view for the side view mirror generally includes an angle α. Disposed adjacent the field of view 29 that is visible to the operator 28 is what is commonly referred to as a blind spot 31 that extends generally through an angle β. The operator 28 cannot see what is in the blind spot 31, crosshatched in FIG. 1, without the head of the operator 28 turning in that direction. Said another way, the operator 28 cannot see anything that is in the blind spot 31 through angle β by looking in the side rear view mirror assembly 26. It is the blind spot sensor 18 that determines whether an object 30, the motor vehicle 30 shown in FIG. 1, is in the blind spot. If so, the blind spot sensor 18 will transmit over the vehicle communication system an appropriate signal to eventually indicate to the operator 28 that an object does in fact exist in the blind spot 31. It will be the operator's decision as to whether the operator 28 will turn his or her head to view the object 30 or to operate as if the object 30 continues to be in the blind spot 31 and act accordingly with regard to the operation and direction of travel of the motor vehicle 10.

Figure 2:
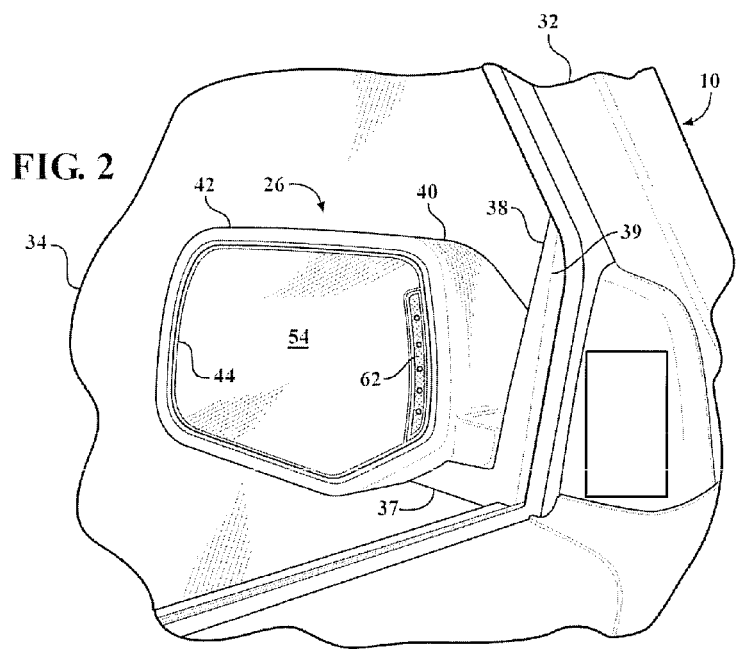
FIG. 2 is a perspective view of one typical embodiment in prior art.

Referring to FIG. 2, the side rear view mirror assembly is generally indicated at 26. The perspective of this Figure is from that of the operator 28 as the operator 28 looks into the side rear view mirror assembly 26 to see that which is rearward of the operator 28 and a portion of the motor vehicle 10. FIG. 2 includes a portion of a door 32 and a window 34.

The side rear view mirror assembly 26 includes a base 38 that is fixedly secured to the motor vehicle 10 and, more specifically, the door 32 of the motor vehicle 10. The base 38 may or may not include a sail similar to the one shown in FIG. 2. The base 38 is secured to the door 32 through known means. Depending on the design of the base 38, the base 38 may include either a lower rear wall 37 or an upper rear wall 39, or both.

The side rear view mirror assembly 26 also includes a mirror case 40 that is movably secured to the base 38. The mirror case 40 is movable in that it may be pivoted about the base 38 to allow the mirror case 40 to move closer to the side 22 of the motor vehicle 10 when situations require a narrower profile of motor vehicle 10. The pivoting of the mirror case 40 also comes in handy when the motor vehicle moves with respect to a fixed object in close proximity therewith such that the mirror case 40 is pushed in one direction or another due to the relative tightness of the position at which the motor vehicle 10 is operating.

The mirror case 40 defines a housing 42 and a mirror opening 44. The mirror opening 44 faces rearward with respect to the forward direction of the motor vehicle 10. The mirror case 40 may include additional openings other than the mirror opening 44 for side markers, turn signals, security lights, sensors or cameras and the like. Otherwise, the mirror case 40 includes a housing 42 that is aerodynamic and aesthetically similar to the general design of the motor vehicle 10. The blind spot indicator 62 is positioned adjacent of the mirror glass or forward of the mirror glass (behind the mirror glass from the perspective of looking at the mirror glass). The blind spot indicator 62 includes a light source 64 that is illuminated when the blind spot sensor 18 senses the presence of the object 30 in the blind spot of the motor vehicle 10.

Figure 3:
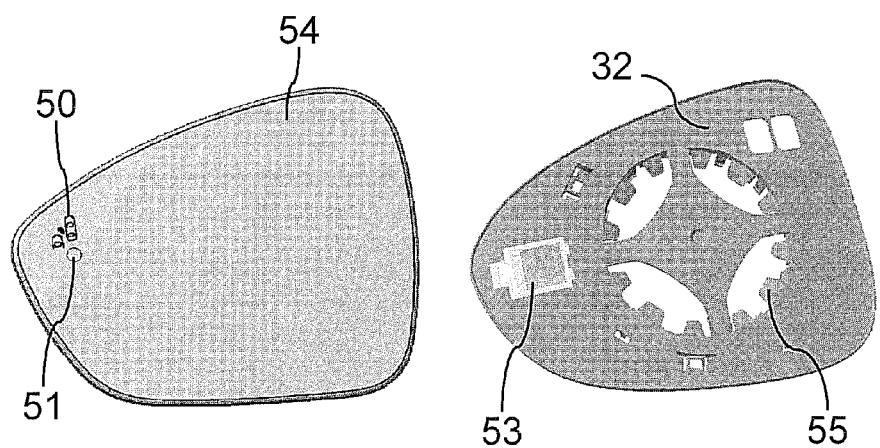
FIG. 3 is a view of mirror glass and backing plate with indication signs.

FIG. 3 shows a view on the front side of a glass mirror and a view on top of a backing plate. The mirror glass 54 is cut to fit into the mirror opening 44 of a rear view mirror assembly. A small icon 50 is engraved near an outboard edge of the mirror glass 54. The small icon 50 is an ISO symbol of two vehicles with one in an overtaking position with respect to another. Below the small icon 50 is a circle 51, through which the light of an indicator 62, discussed subsequently, shines toward the operator 28.

A backing plate 52 is adapted to a mount 55 having openings to allow the threading a wire harness for an actuator therethrough.

Figure 4:
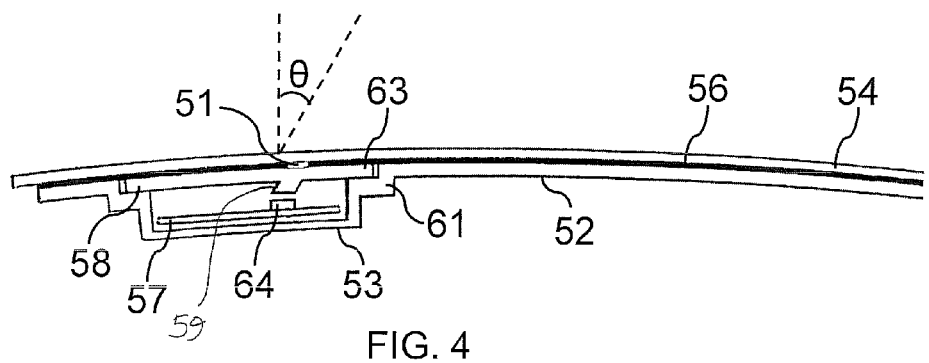
FIG. 4 is a cross section of a first embodiment of invention according FIG. 3.

FIG. 4 shows a cross section of a mirror glass 54 with the backing plate 52 attached thereto. Disregarding the orientation with respect to the motor vehicle 10 for purposes of this portion of the discussion, the mirror glass 54 has a front side 60 that is visible for the driver. On the back side is a reflective surface 56 that reflects light in the visible spectrum. The reflective material is normally a metal or an alloy that is sputter deposited onto the glass substrate. In the area of the circle 51, a portion of the reflective material or surface 54 is removed either totally, or to a defined remaining thickness by laser engraving. It is possible to use a very thin remaining reflective surface 56 which appears semi-transparent to operator. Some mirror glasses have additional color protective layers to protect the reflective layer and to avoid semi transparent appearance. These color layers must also be removed for the indicator light to shine though the mirror glass.

The backing plate 52 is attached to the mirror glass 54 normally by a double side glue foil. The backing plate 52 forms an integrated mounting surface 53 that receives and hosts the indicator light 62.

The mounting surface 53 is formed to cover at least a printed circuit board 57, a light source 64 and a cover 58. The printed circuit board 57 is mounted on the bottom to the mounting surface 53 and the light source 64 in form of a LED is attached on the top of the printed circuit board 57. The mounting surface 53 forms shoulders 61 to be used as bearing faces for the cover 58. End areas 63 of the cover 58 fit into the space that is formed by the shoulder 61 of the mounting surface 53. The cover 58 is formed as a plate to close the space created by the mounting surface 53 and is integrated into the cover 58. A light guiding pin 59 is also formed. The light guiding pin 59 is directed in direction to the LED and inclined versus the vertical by an angle theta (Θ). The angle theta allows a direction of light from the light source 64 into the light guide pin 59 through the circle opening 51 and the mirror glass 54 to driver's eyes.

Figure 5:
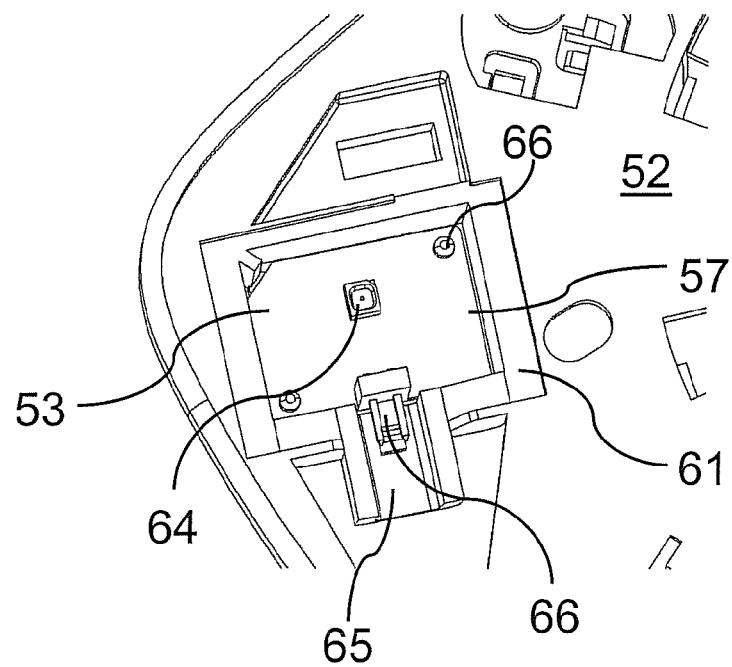
FIGS. 5 and 6 are top views of the first embodiment of invention.

FIG. 5 shows a top view of the backing plate 52. The mounting surface 53 is surrounded by the shoulder 61. The printed circuit board 57 is mounted to the bottom of the backing plate 52, and more particularly, the mounting surface 53, by screws 66. The LED 64 is a top mounted LED. The mounting space includes a connection area 65, that hosts a connector 66 or connector pins to contact the printed circuit board 57.

Figure 6:
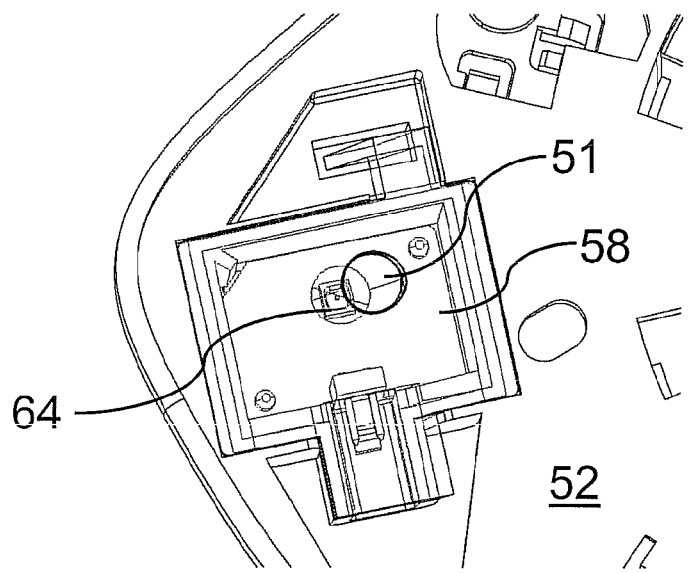

In FIG. 6 the open mounting space 53 is closed with the cover 58. The cover is glued to the shoulders 61 of the mounting space. In another embodiment the cover 58 is mounted with a seal that is formed on the shoulders 61 of the mounting surface 53. The circle 51 shows the position of the circle in the reflective surface. The light guiding pin 59 is directed from this circle position versus the light source 64. In this embodiment, the mounting surface 53 has a rectangular shape adapted to the size of the printed circuit board 57. The depth between the backing plate 52 and the mounting surface 53 is defined by the mounting height of the LED 64 and the light guiding pin 59.

Figure 7:
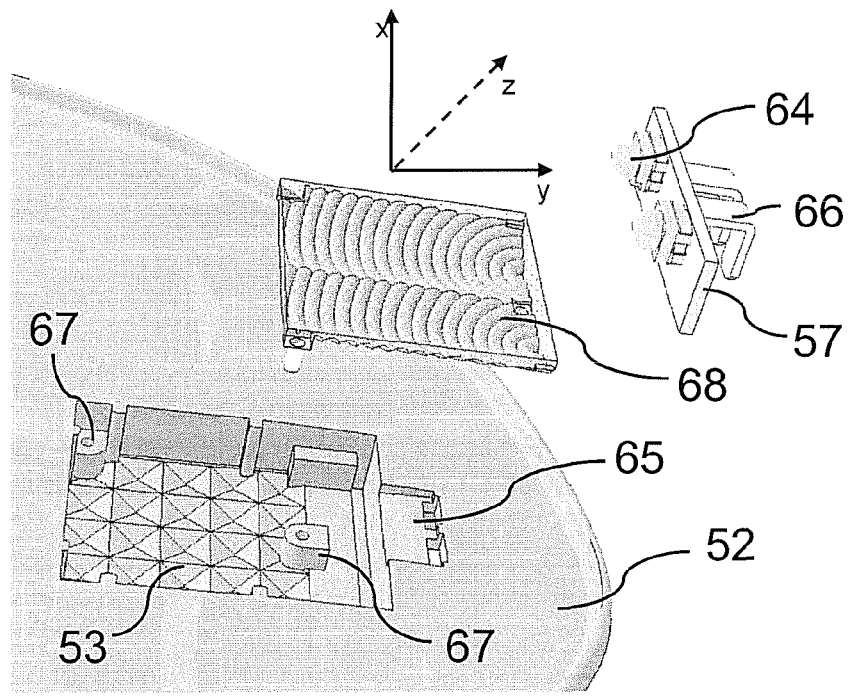
FIGS. 7 and 8 show a second embodiment of invention.
Figure 8:
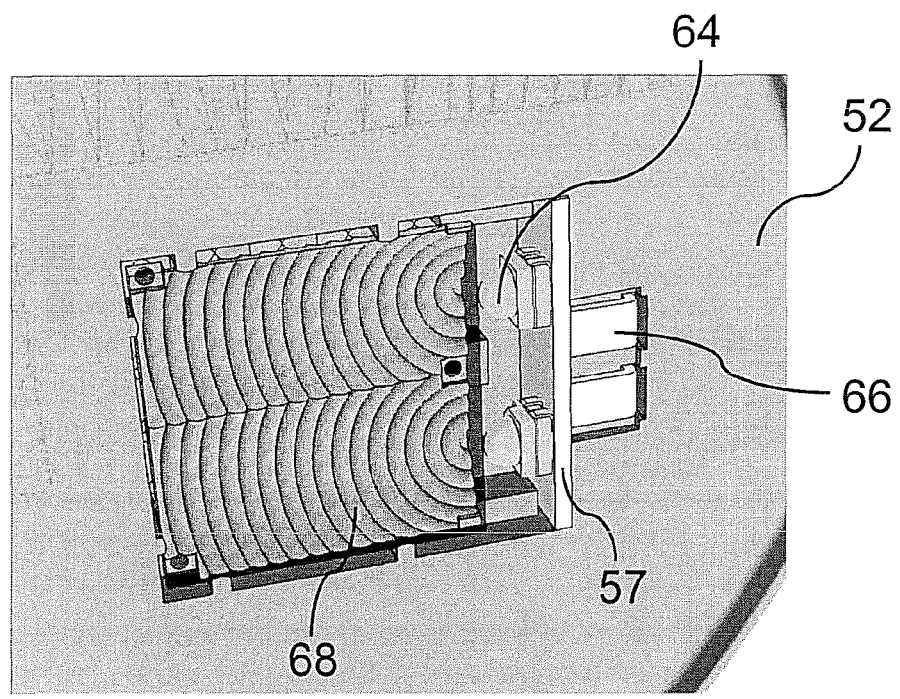

FIGS. 7 and 8 shows another embodiment of the invention with integrated indicator into the backing plate 52. The backing plate 52 includes a mounting surface 53 formed integrally in the same plastic device. The mounting surface 53 has a connection area 65 and supports 67. A rectangular light guide tray 68 is adapted to be mounted to the mounting surface 53. Two LEDs 64 are mounted on a printed circuit board 57 with connection pins 66.

FIG. 8 shows the embodiment as it is mounted in the mounting surface 53. The light guide tray 68 is screwed to the support members 67 extending up from the mounting surface 53. The printed circuit board 57 is integrated with the mounting surface 53. Two LEDs are installed in front of the face side of the light guide that forms two trays.

Figure 9:
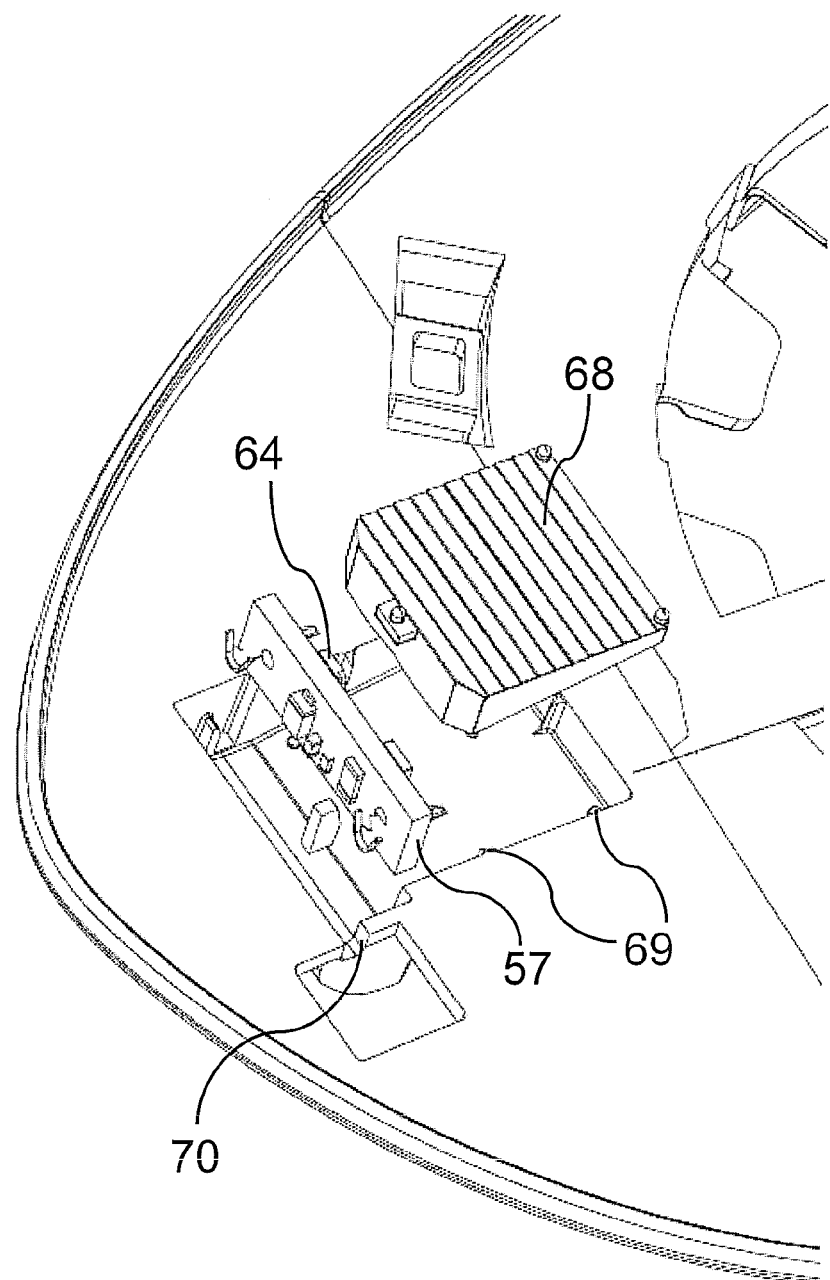
FIGS. 9 and 10 show a third embodiment.
Figure 10:
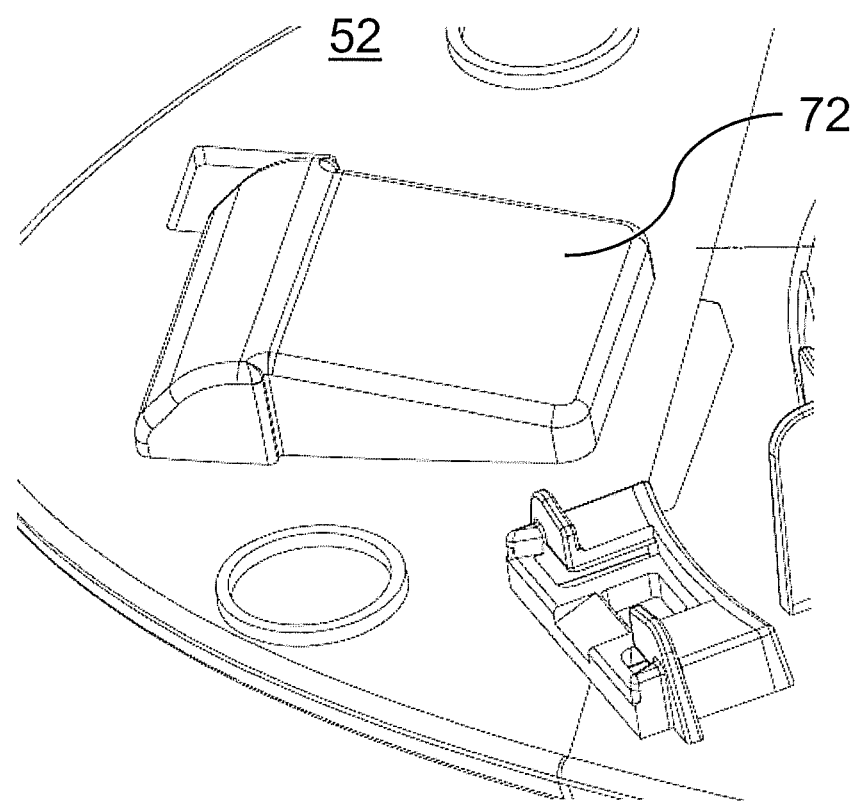
Figure 11:
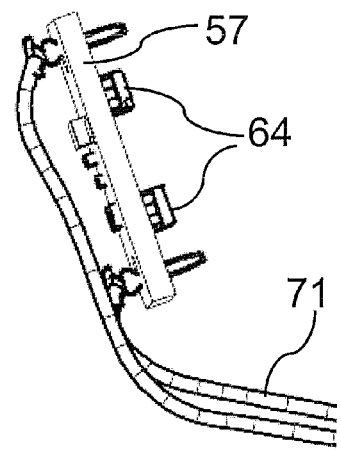
FIG. 11 shows an example of a harness.

FIGS. 9 and 10 show another alternative embodiment. The backing plate 52 includes a mounting surface 53 that is adapted to host a wedge formed light guide tray 68. The light guide tray 68 is pressed into the opening of the mounting surface 53 where small nodules or bosses 69 hold the light guide tray 68 in the opening. The mounting surface 53 has a lead through channel 70 for cables to contact the printed circuit board 57. The size of the lead through channel 70 is configured to allow the two contact cables 71 to be installed. The small remaining portion of the lead through channel 70 must not be closed after final installation. This small opening helps to exchange air and humidity in the finally closed indicator. Details of the board and the cables can be seen in FIG. 11.

FIG. 10 shows the rear side of the backing plate 52. The form of the space between the mounting surface 53 and the backing plate 52 complements the wedged shape of the light guide tray 68. The highest position of the backside cover is the mounting place of the printed circuit board 57. The total height is small for the printed circuit board 57 and has the dimensional capacity only to host the LEDs.

The mounting surface 53 declines slightly to form a wedged structure. The opening for the cables is not visible for it is on the hidden side of the mounting space.

Figure 12:
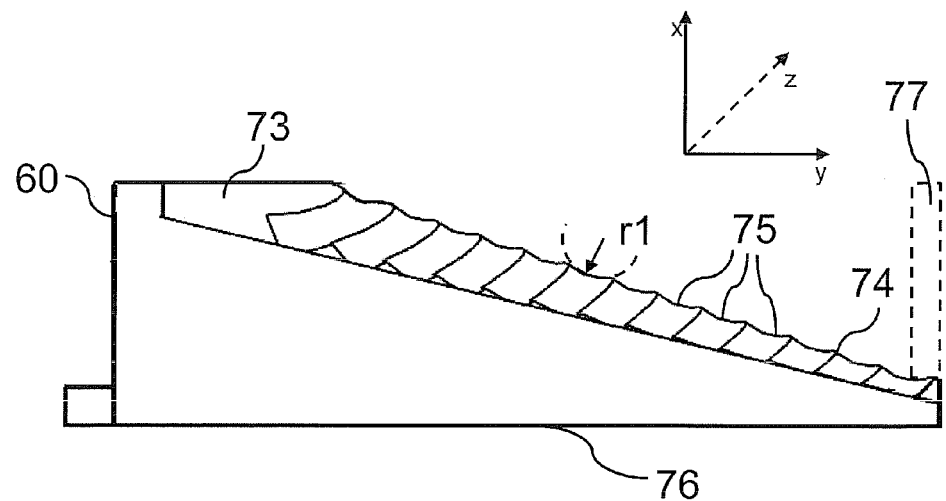
FIGS. 12 through 14 show different views of the inventive light guide.

FIG. 12 shows a cross section of the light guide tray 68 along its y-axis. The light guide tray 68 is wedge shaped. Starting from the front face 60, an area for free travelling of light is provided that declines slightly. In this area, light beams are not reflected and can travel undisturbed. The light in this part of the light guide tray 68 is not parallel, for the light source, the LED, has an angle of emission of about 120 degrees and the light of the LED 64 is not focused into the light guide tray 68. The inner declining reflective surface 74 that reflects light by total reflection conditions has a tile structure without any steps. Arcuate segments form surfaces 75 of the reflective surface 74. These surfaces 75 have radii r1 as marked in the drawing. In this example, all parts 75 have the same radius r1 and the contact lines between the single parts have chamfered edges. The contact lines do not contribute really to the light defection and reflection.

In an alternative embodiment the parts 75 have increasing or decreasing radii over the length y of the wedged light guide tray.

The plane surface 76 lies parallel to glass surface and is not protected or covered by an additional cover. The whole indicator is covered by the mirror glass only. In addition to the design shown in the drawing, the plane surface 76 can be structured with a prismatic structure to increase the efficiency of light beam deflection versus the operator's eyes.

A spacer 77, shown in phantom in FIG. 12, is used to mount the light guide tray 68 to the mounting surface 53. The spacer 77 has the function to hinder the light guide tray to tilt in the mounting space and to be a bearing point for ejectors in the plastic molding tool.

Figure 13:
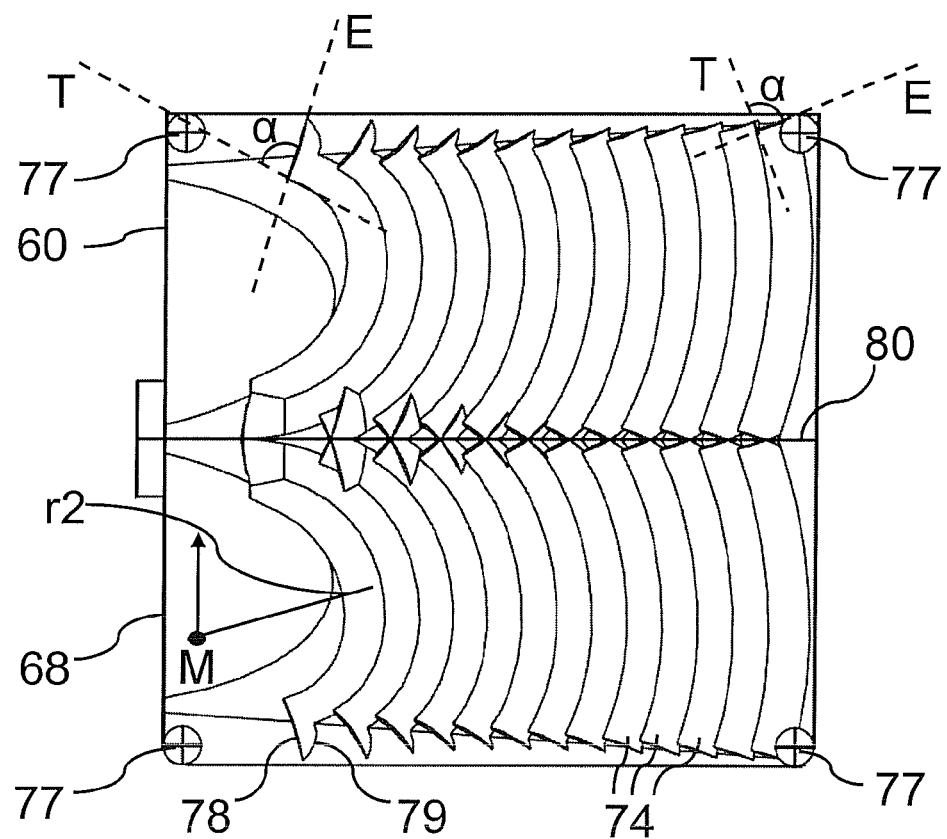

FIG. 13 shows a top view on a light guide tray 68 with spacers 77 arranged at the outer points of the structure. The light guide tray 68 is divided in two trays along a middle line 80. In alternative embodiments the tray structures are used as a single light guide with one LED or multiple light guides with several LEDs. With multiple structures, a broader surface can be illuminated. As an example it is possible to use a first LED as alert indicator for object detection in a blind sport and illuminate with the first light guide tray a first symbol as an ISO symbol for overtaking vehicles. This symbol is illuminated by using a red light LED. The parallel arranged second light guide tray is illuminated by a second LED that reacts to a signal of a temperature control and is illuminated by another colored LED for example a white LED. With the tray light guide structure, several combinations of indictors with several colors are created.

The tile structure 75 has arcuate segments with radius r3, wherein the radius r3 increases from surface of light coupling the front face 60 to the end of the light guide tray. In addition the middle point of the arcuate surfaces moves along the arrow in drawing 13. Part by part 74, the radius r3 increases slightly and continuously. Ends of the parts 74 include facets 78, which have an angle alpha ($\alpha$) between the end facet E and the tangent to the end of the arcuate segment T. The angle alpha is kept constant along the whole light guide tray. The end facet 78 is attached with a curved shoulder 79 to the single parts 74 of the structure.

Figure 14:
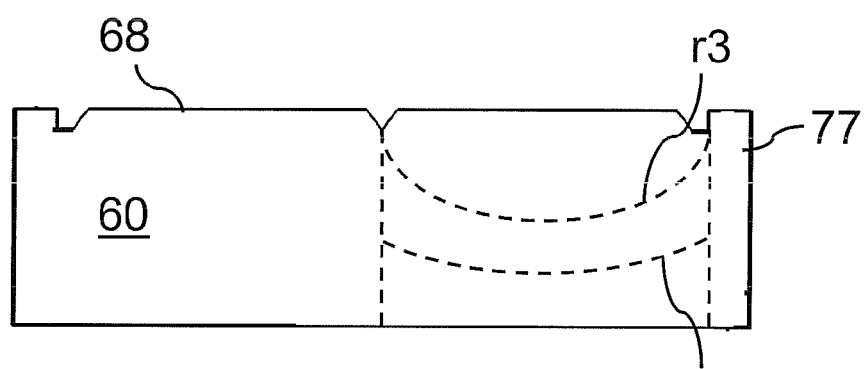

FIG. 14 shows a cross section through the front face 60 of the light guide tray 68. The radii of the parts 74 as schematically inserted in dotted lines. Close to the front face 60, the parts 74 have small radii r3 and are strongly curved to build a tray. The curvatures of the parts 74 decrease along the wedged light guide and ends up in a radius r4 that is bigger than r3 close to the front face.

The light guide forms a tray structure that starts at the coupling in end of the front face of the light guide and ends at the small side of the wedge. Using more than one LED makes it necessary to use more than one light guide tray. For a complex structure, the light guide tray deflects light very efficiently toward the driver eliminating the need for a reflector in the indicator.

The deflection angle from the vertical line to the mirror glass is around 15 to 50 degrees. The angle can be adapted by dimensioning of the curved parts 74 of the light guide by adapting radii.

Because the indicator does not use a reflector, the dimension of the optical indicator is small. The height of the mounting space is only limited by size of LEDs and the related electrical connections and the printed circuit board. The optical indicator does not have a cover plate for the mirror glass covers the indicator. Normally, the backing plate with the integrated indicator is glued to the mirror glass with a double die glue foil. It should be appreciated by those skilled in the art that other ways of securing the two parts is possible.

The light shines through symbols that are prepared out of the reflective or color layer of the mirror glass to be visible by the driver.

| Legend: | |
|---|---|
| 10 | motor vehicle |
| 12 | road |
| 14 | dashed line |
| 16, 18 | blind spot sensors |
| 20, 22 | side of the motor vehicle |
| 24, 26 | side rear view mirror assemblies |
| 28 | operator |
| 29 | field of view |
| 30 | object |
| 31 | blind spot |
| 32 | portion of a door |

-continued

| Legend: | |
|---|---|
| 34 | window |
| 38 | base |
| 37 | lower rear wall |
| 39 | upper rear wall |
| 40 | mirror case |
| 42 | mirror housing |
| 44 | mirror opening |
| 50 | symbol |
| 51 | circle |
| 52 | backing plate |
| 53 | mounting surface |
| 54 | Mirror glass |
| 55 | mount for actuator |
| 56 | reflective surface mirror |
| 57 | printed circuit |
| 58 | cover |
| 59 | light guide pin |
| 60 | front side |
| 61 | shoulder |
| 62 | indicator |
| 63 | end area of cover |
| 64 | light source |
| 65 | connection area |
| 66 | connector |
| 67 | support |
| 68 | light guide tray |
| 69 | nose |
| 70 | lead through |
| 71 | cable |
| 72 | backside of mounting space |
| 73 | free travelling of light |
| 74 | reflective surface |
| 75 | part |
| 76 | plan surface |
| 77 | spacer |
| 78 | end facet |
| 79 | curved leg |
| 80 | middle line |

We claim:

1. A rear view mirror assembly for a motor vehicle, said rear view mirror assembly comprising:
a mirror base adapted to be secured to the motor vehicle;
a mirror case movably secured to said mirror base, said mirror case defining a mirror opening rearward thereof;
a backing plate operatively mounted to said mirror case and movable with respect to said mirror case, said backing plate defining a backing plate surface and forming an integrated mounting space defining a mounting surface spaced apart from said backing plate surface;
a mirror glass fixedly secured to said backing plate surface of said backing plate, said mirror glass having a reflective surface;
a printed circuit board mounted to said mounting surface, said printed circuit board including a light source; and
a light guide tray mounted to said mounting surface and being wedge-shaped in cross section along its y-axis starting from its front face disposed adjacent to and spaced apart from said light source to provide an area for free travelling of light emitted by said light source before it is received by said front face of said light guide tray, said light guide tray declining slightly with an inner declining surface reflecting light by total reflection conditions, wherein said inner declining surface defines a plurality of arcuate tile segments each lower than the next and having a first radius such that said each of said plurality of arcuate tile segments is curved with said first radius in cross section along its z-axis to form said light guide tray, wherein said light guide tray has a plane surface parallel to said mirror glass opposite said declining surface; and
wherein said mirror glass visible through said mirror opening of said mirror case and covering said backing plate, defines a transmissive area disposed adjacent said light source and said light guide to allow light emitted by said light source to pass therethrough.

2. A rear view mirror assembly as set forth in claim 1 wherein said transmissive area defines a symbol.

3. A rear view mirror assembly as set forth in claim 1 wherein each of said plurality of arcuate tile segments, starting at the side facing the front face, has a radius of curvature larger than a radius of curvature of one of said plurality of arcuate tile segments immediately adjacent thereto.

4. A rear view mirror assembly as set forth in claim 1 wherein each of said plurality of arcuate tile segments defines a middle point (M) of radii such that each of said middle points is arranged along a line parallel to said front face of said light guide tray.

5. A rear view mirror assembly as set forth in claim 1 wherein each of said plurality of arcuate tile segments includes a reflective surface.

6. A rear view mirror assembly as set forth in claim 1 wherein each of said plurality of arcuate tile segments includes an end facet at either end thereof.

7. A rear view mirror assembly as set forth in claim 6 wherein each of said plurality of arcuate tile segments defines a tangent disposed at an angle with respect to said respective end facets.

8. A rear view mirror assembly as set forth in claim 1 including a spacer disposed between said light guide tray and said mirror glass.

9. A rear view mirror assembly as set forth in claim 1 wherein said mounting surface defines an orientation that complements said cross-sectional wedge shape of said light guide tray.

10. A rear view mirror assembly as set forth in claim 1 including nodules for securing said light guide tray in a position disposed adjacent said mounting surface.

11. A rear view mirror assembly as set forth in claim 1 including a plurality of light guide trays, each transmitting a different color.

12. A rear view mirror assembly as set forth in claim 11 including a plurality of light sources, each of a different color, associated with each of said plurality of light guide trays.

* * * * *